United States Patent [19]
Holstead et al.

[11] 3,859,217
[45] Jan. 7, 1975

[54] APPARATUS FOR SEPARATING HIGH FROM LOW VISCOSITY FLUIDS

[75] Inventors: Robert D. Holstead, Springfield; Charles E. Wyman, Hampden, both of Mass.

[73] Assignee: Monsanto Company, St. Louis, Mo.

[22] Filed: Jan. 15, 1973

[21] Appl. No.: 323,470

[52] U.S. Cl.......... 210/523, 23/270 R, 210/DIG. 15, 210/84, 210/322
[51] Int. Cl...................... B01d 57/00, B01d 11/00
[58] Field of Search ............ 210/523, 23, 321, 322, 210/84, DIG. 15; 209/463, 464, 465; 261/79 A; 23/270 R

[56] References Cited
UNITED STATES PATENTS

| | | | |
|---|---|---|---|
| 1,967,799 | 7/1934 | Yoon et al. | 261/79 A |
| 2,043,409 | 6/1936 | Heitmann | 23/270 R |
| 2,600,871 | 6/1952 | Helwig | 23/270 R X |
| 2,714,114 | 7/1955 | Scott | 23/270 R X |
| 3,529,938 | 9/1970 | Yoon et al. | 23/270 R |
| 3,565,634 | 2/1971 | Osterman | 23/270 |
| 3,714,764 | 2/1973 | Gething | 261/79 A X |

Primary Examiner—Theodore A. Granger
Attorney, Agent, or Firm—Joseph S. Nelson; Edward P. Grattan; James C. Logomasini

[57] ABSTRACT

Apparatus for separating relatively high viscosity from relatively low viscosity fluids which are immiscible but in admixture. The apparatus uses viscous drag forces in combination with an opposed force to achieve such separation. A cylindrical vessel has a shaft extending therethrough which is coaxial therewith. Screw means are affixed to either such vessel or such shaft and radially projects towards the other such member. When the shaft rotates relative to said vessel, and such admixture is input into a mid-region of said vessel, separation results.

4 Claims, 6 Drawing Figures

PATENTED JAN 7 1975                    3,859,217

APPARATUS FOR SEPARATING HIGH FROM LOW VISCOSITY FLUIDS

BACKGROUND

Equipment for separating by physical means a relatively high viscosity fluid or fluid-like material from a relatively low viscosity fluid when the two such fluids are immiscible in one another but in admixture exists in many different forms and utilizes many different principles, including centrifugation, filtration, evaporation (drying), distillation, dissolution, and the like.

So far as is now known, however, none of such known equipment utilizes, as its operative principle, a screw in combination with viscous drag forces and an opposed force simultaneously applied. The opposed force may be internally generated in the equipment and/or be an applied body force. The result is that the high viscosity fluid is moved in one direction while the low viscosity fluid is moved in the reverse direction so that separation of one fluid from the other is accomplished.

There has now been discovered a new and very useful apparatus for accomplishing separation of such fluids from each other which operates as just indicated. The apparatus is relatively simple and requires relatively small amounts of power to operate. The apparatus may be operated batch-wise or continuously and is generally capable of being very effective for accomplishing such separations.

For certain applications, the apparatus of this invention enables one to achieve such separations with an ease and effectiveness not heretofore known. For example, when a desired relatively high viscosity fluid having a relatively low density is to be separated from a relatively low viscosity fluid having a relatively greater density than that of the relatively high viscosity fluid, a difficult problem can be presented. Conventional centrifuges function well to remove peripherally a high viscosity from a low viscosity fluid when the high viscosity fluid is of greater density than the low viscosity fluid, but, when the reverse is true, the high viscosity fluid must be removed axially. The latter form of removal can be difficult to accomplish, particularly when the high viscosity fluid is not particularly flowable at relatively low pressures. One instance of such a fluid mixture is a freshly coagulated aqueous latex of a graft polymerized elastomer, such as one of the conventional ABS type.

SUMMARY

The present invention provides apparatus for separating a relatively high viscosity, fluid-like material mixed with a separate phase of relatively low viscosity fluid material. The apparatus defines, during operation, an envelope region which is generally cross-sectionally circular in configuration and which generally has a longitudinal length greater than the (average) diameter thereof. This envelope region is itself defined by, and exists as a space between, a moving wall and a stationary wall. Projecting into this envelope region radially is a spirally extending inclined surface which is affixed to one of these walls. When a mixture of two such fluid materials is introduced into this envelope region about at a midregion thereof, the viscous drag forces generated in this envelope region are at least sufficient to move the high viscosity fluid in the envelope region in the direction of advancement of such spirally extending inclined surface, while simultaneously, an opposed force or forces, which may be an internally generated pressure force and/or an applied body force or forces is at least sufficient to move the low viscosity fluid in the envelope region in the opposed direction. The respective so-separated fluids are removed from the opposed end portions of such envelope region. A gaseous space may or may not be maintained in such envelope region in a domain between such opposed end portions.

FIGURE DESCRIPTION

The invention is better understood by reference to the appended drawings wherein.

DETAILED DESCRIPTION

Figure 1A:
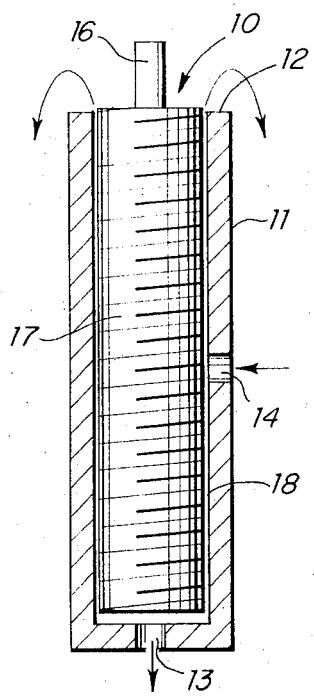
FIGS 1A and 1B are side elevational schematic-type illustrations of two embodiments of the present invention, some parts thereof broken away and some parts shown in section.

Turning to FIG. 1A, there is seen an embodiment of the present invention herein designated in its entirety by the numeral 10. Embodiment 10 incorporates a generally cylindrical vessel 11 which has an open (upper) end 12. Vessel 11 has a port 13 in the (lower) opposed end thereof, and a port 14 in a middle portion thereof. The interior length of vessel 11 is greater than the interior diameter thereof.

A shaft 16 extends generally through vessel 11 and is generally coaxial therewith. Journal means (not shown) permits rotational movements of shaft 16 relative to vessel 11.

A screw 17 is affixed to shaft 16. Screw 17 has a helically extending, radially projecting, generally continuous blade portion. Screw 17 is generally coaxial with vessel 11 and its blade portion defines in combination with vessel 11 and shaft 16 a circumferentially extending (relative to screw 17) envelope region 18 within vessel 11 between vessel 11 and shaft 16.

A powerhead (not shown) effects rotation of shaft 16 relative to vessel 11.

The relationship between vessel 11, shaft 16, screw 17, open end 12, port 13, and port 14 is such that, when shaft 16 rotates relative to vessel 11, as by the powerhead, and when a mixture (not shown but indicated by an arrow) of relatively high viscosity, fluid-like material and a separate phase of relatively low viscosity fluid material are input into vessel 11 through port 14, such high viscosity fluid material output from the end 12 of vessel 11 (not shown but indicated by arrows), and such low viscosity fluid material outputs from port 13 (not shown but indicated by an arrow). Vessel 11 may be considered to be oriented so as to have its longitudinal axis vertical.

Figure 1B:
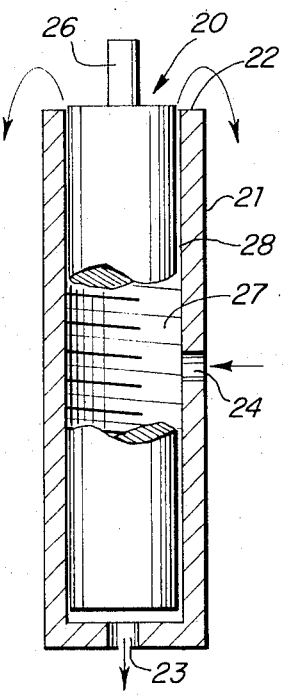

In FIG. 1B, there is seen another embodiment of the present invention herein designated in its entirety by the numeral 20. Embodiment 20 incorporates a generally cylindrical vessel 21 which has an open (upper) end 22. Vessel 21 has a port 23 in the (lower) opposed end thereof, and a port 24 in a middle portion thereof. The interior length of vessel 21 is greater than the interior diameter thereof.

A shaft 26 extends generally through vessel 21 and is generally coaxial therewith. Journal means (not shown) permits rotational movements of shaft 26 relative to vessel 21.

A screw 27 is affixed to the inside wall of vessel 21. Screw 27 has a helically extending, radially projecting, generally continuous blade portion. Screw 27 is generally coaxial with vessel 21 and its blade portion defines in combination with vessel 21 and shaft 26 a circumferentially extending (relative to screw 17) envelope region 28 within vessel 21 between vessel 21 and shaft 26.

A powerhead (not shown) effects rotation of shaft 16 relative to vessel 11.

The relationship between vessel 21, shaft 26, screw 27, open end 22, port 23, and port 24 is such that, when shaft 26 rotates relative to vessel 21, as by the powerhead, and when a mixture (not shown but indicated by an arrow) of relatively high viscosity, fluid-like material and a separate phase of relatively low viscosity fluid material are input into vessel 21 through port 24, such high viscosity fluid material outputs from the end 22 of vessel 21 (not shown but indicated by arrows), and such low viscosity fluid material outputs from port 23 (not shown but indicated by an arrow). Vessel 21 may be considered to be oriented so as to have its longitudinal axis vertical.

In the embodiments 10 and 20, while rotation of respective shafts 16 and 26 is preferred, rotation of shafts 16 and 26, respectively, relative to vessels 11 and 21 may be accomplished by any means desired as those skilled in the art will appreciate. Embodiment 10 is presently preferred.

Figure 2:
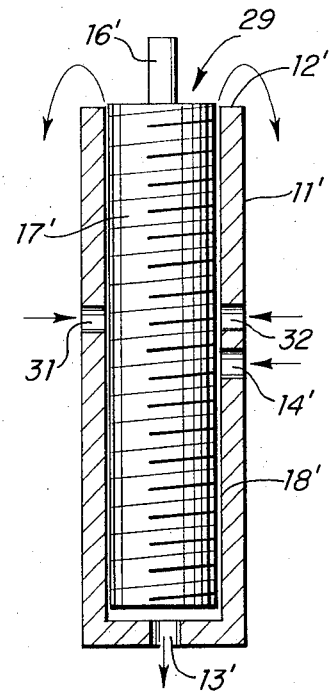
FIG. 2 is a view similar to FIG. 1A but illustrating another embodiment thereof.

In FIG. 2 is shown an embodiment 29 which is similar to embodiment 10. Corresponding components are similarly numbered but with prime marks added thereto. Here, a mixture to be separated is input from a plurality of ports 14', 31 and 32. Such mixture may, if desired, be first formed in envelope region 18' from separate components input via ports 14', 31 and 32; for example, a different latex may be input through each of ports 31 and 32 while a coagulant for such is input through port 14'. Mixing in vessel 11' is easily obtained; for example, by shutting off all ports and reversing the normal rotation of screw 17' until mixing is achieved, followed by opening such ports and operating embodiment 29 in its normal fashion.

One advantage to using the embodiments 10 and 20 with vessels 11 and 21, each vertically oriented, is that in these embodiments, gravity can be used to separate out the low viscosity fluid from the high during embodiment operation. When this is done for a lower density, high viscosity fluid, however, it may then be preferred to maintain a level of low viscosity fluid in the bottom of a vessel such as 11 which is at least sufficient to cover the bottom of screw 17 during embodiment 10 operation so as to separate as much as possible of the high viscosity fluid from the low viscosity fluid of a starting mixture of such.

When such a low viscosity fluid level is so maintained, embodiment 10 is equipped, as respects port 13, with a fluid transfer regulation means which maintains the desired fluid level in vessel 11. Such a fluid transfer regulation means has both a flow means and a pressurization means. The flow means permits escape from port 13 of low viscosity fluid at a rate not greater than the rate such fluid enters vessel 11 through port 14, depending upon the degree of separation of the two fluids. The pressurization means maintains the fluid in the lower portion of vessel 11 at the level which is at least sufficient to cover a lower region of the blade portion of screw 17 above port 13. While thus, as those skilled in the art will readily appreciate, a fluid transfer regulation means can be in many specific forms, a simple and preferred form for such means is shown in FIG. 3.

Figure 3:
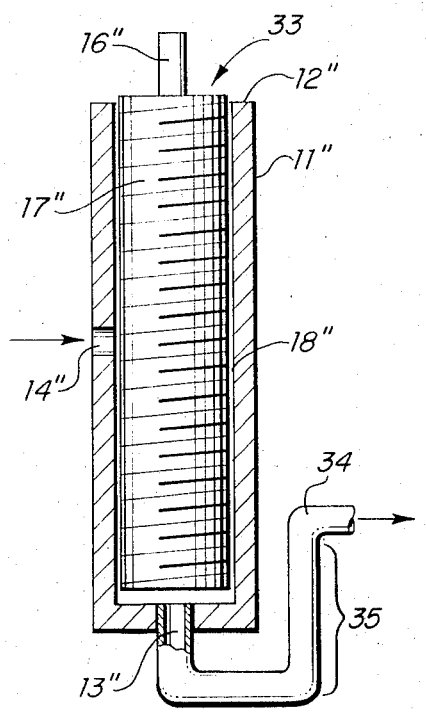
FIG. 3 is a view similar to FIG. 1A, but illustrating another embodiment thereof.

The embodiment 33 of FIG. 3 is similar to embodiment 10, and corresponding components are similarly numbered but with double prime marks added thereto. Here, a manometer 34 has one leg thereof interconnected with port 13''. The diameter of the conduit forming manometer 34 is chosen to be large enough to accomodate the anticipated charge rate of low viscosity fluid input through port 14'' and the length of leg 35 of manometer 34 is chosen to be long enough to maintain the desired fluid pressure head in the bottom of vessel 11''.

Figure 4:
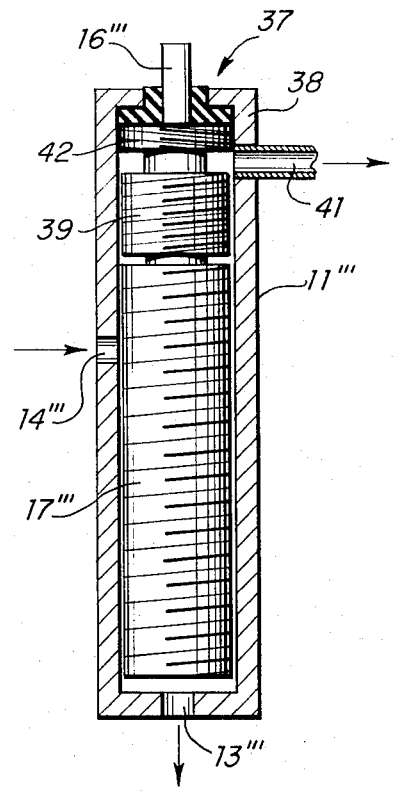
FIG. 4 is a view similar to FIG. 1A but illustrating another embodiment thereof.

To avoid fluid collection problems possibly associated with a simple over-flow type arrangement as depicted in embodiments 10, 20, 29, and 33, an arrangement such as that shown for embodiment 37 in FIG. 4 may be employed. The embodiment 37 is similar to embodiment 10 and corresponding components are similarly numbered but with triple prime marks added thereto. Here, the open end 12 of vessel 11 (embodiment 10) is replaced by an integral head cap 38 for vessel 11'''. Shaft 16''' is extended and has mounted thereon, generally coaxially with a lifting screw 17''', a conventional pumping screw 39. Pumping screw 39 functions not only to pressurize fluid reaching such from the (upper) end of lifting screw 17''', but also serves to effectively aid in squeezing out low viscosity fluid which tends to cling to, and remain in, the high viscosity fluid carried upwards by screw 17''', which further enhances separation of the high from the low viscosity fluid during operation of embodiment 37. Thus, a rather well separated high viscosity material may be delivered for transmission through a conduit 41 above (or at the terminal discharge region of) pumping screw 39.

To prevent material leakage between shaft 16''' and vessel 11''', a suitable sealing means is provided in association with cap 38, such as a viscoseal-type (reverse screw thread) seal 42, or other convenient assembly, if desired.

Figure 5:
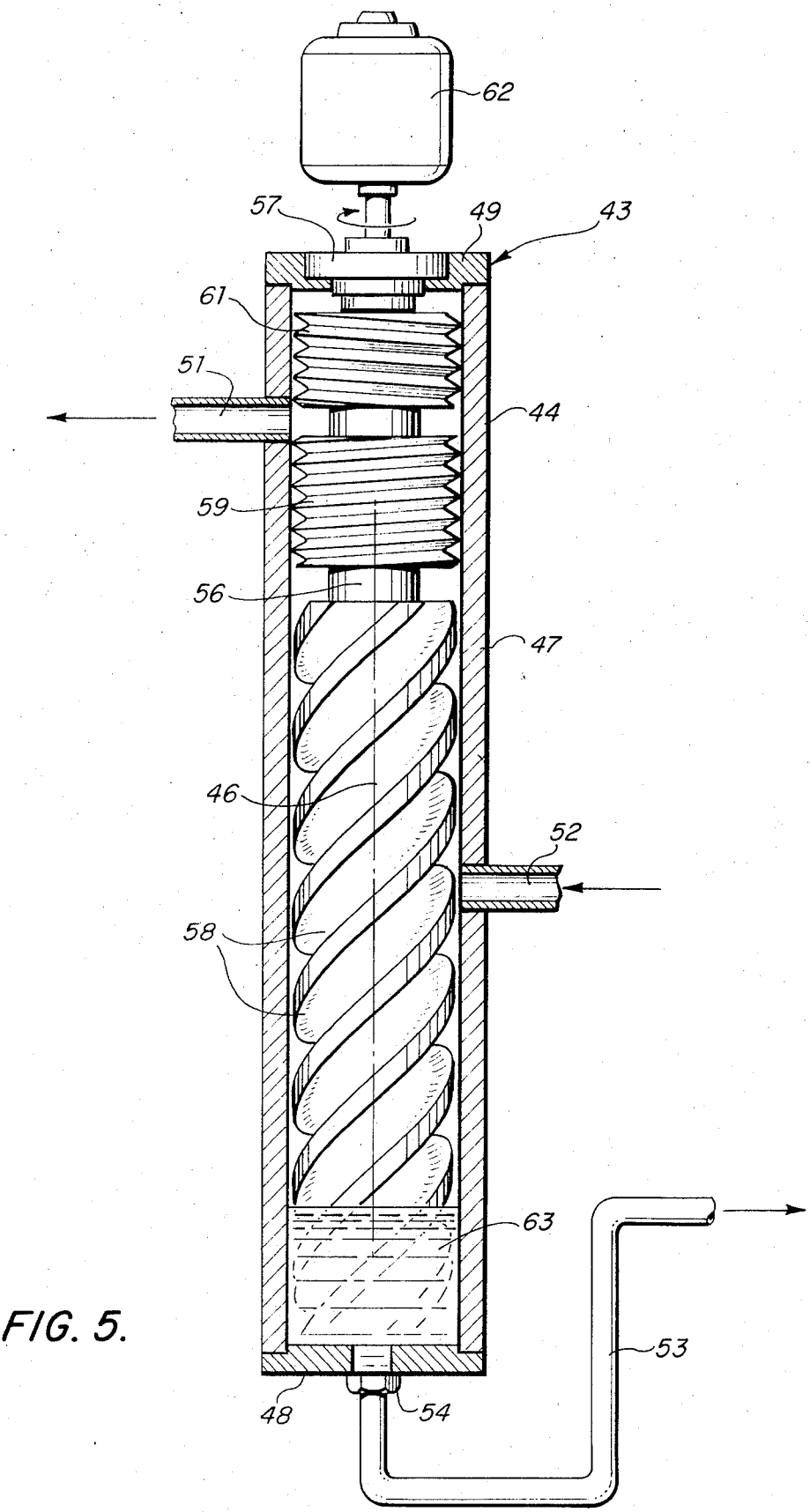
FIG. 5 is a detailed view in side elevation of an embodiment of the present invention, some parts thereof broken away and some parts thereof shown in section.

In FIG. 5 is shown an embodiment of this invention which is designated in its entirety by the number 43. Embodiment 43 is adapted for gravitationally separating a relatively high viscosity, high viscosity material mixed with a separate phase of a relatively low viscosity fluid material.

Embodiment 43 has a generally cylindrical vessel 44 oriented with the axis 46 thereof generally vertical. Vessel 44 is formed by a cylindrical pipe-like section 47 which is fitted with end plates 48 and 49. End plates 48 and 49 sealingly engage cylindrical section 47, as by means of welding, screw threads (not shown), or the like. Cylindrical section 47 has a first conduit 51 interconnected (as by mating screw threads, not shown) with an aperture formed in an upper region of cylindrical section 47 and a second conduit 52 interconnected (similarly to conduit 51) with an aperture formed in a middle region of cylindrical section 47. A third conduit 53, in the shape and form of a manometer is interconnected with end plate 48 (as by means of mating screw threads, not shown), a nut 54 threaded onto third conduit 53 pressures a sealing gasket (not shown) against end plate 48 for sealing engagement between end plate 48 and conduit 53, though any convenient sealing means may be employed in embodiment 43. The interior length of vessel 44 is substantially greater than the interior diameter thereof. Conduit 53 functions as described above in relation to manometer 34 for embodiment 33.

A shaft 56 extends generally through vessel 44 and is coaxial therewith. Shaft 56 is, in effect, suspended from bearing assembly 57 mounted in end plate 49 which adapts shaft 56 for rotational movements within vessel 44.

A lifting screw 58 joins shaft 56 coaxially. Screw 58 extends through lower and middle regions of vessel 44 coaxially and has radially projecting, helically extending, generally continuous blade portions which radially terminate in adjacent, spaced relationship to the inner walls of vessel 44.

A pumping screw 59 joins shaft 56 coaxially. Screw 59 is located above screw 58 in vessel 44 and extends not above conduit 51. Pumping screw 59 is of a conventional construction.

A sealing screw 61 joins shaft 56 coaxially. Sealing screw 61 is of the viscoseal type and has reverse threads relative to those of lifting screw 58 and pumping screw 59 as those skilled in the art will appreciate. Screw 61 is located above screw 59 in the upper interior end region of vessel 44 and above conduit 51. Any convenient sealing means could be employed in place of screw 61.

A powerhead, here illustrated as an electric motor 62, interconnects with shaft 56 (as by a coupler, not shown) and is adapted to rotatably drive shaft 56 in a direction such that the blade portions of lifting screw 58 and pumping screw 59 turn upwardly during operation of embodiment 43.

In operation, a mixture of such low and high viscosity fluids to be separated is input into vessel 44 through conduit 52 as motor 62 turns shaft 56. High viscosity fluid is separated from low viscosity material and is carried upwards by lifting screw 58. Low viscosity material moves downward; a head 63 of low viscosity material is maintained in the lower internal region of vessel 44 by means of conduit 53.

High viscosity fluid at the upper end of lifting screw 58 comes into contact with pumping screw 59, which receives and pressurizes the high viscosity fluid leaving the lifting screw 58 before this fluid reaches the conduit 51, so that this fluid is output from vessel 44 under a positive pressure through conduit 51. Also, the action of screw 59 aids in further separating low viscosity fluid from high viscosity fluid.

The flights of the lifting screw 58 are preferably considerably radially deeper than the flights of the pumping screw 59.

The invention is further illustrated by the following illustrative use example:

EXAMPLE

A polybutadiene latex is subjected to graft polymerization in emulsion at about 80°C. with a monomer composition at the rate of 40 parts by weight monomer composition per 100 parts elastomer substrate. The monomer composition comprises 70 weight per cent styrene and 30 weight per cent acrylonitrile (100 weight per cent basis). Water is added prior to the grafting to yield a 35 weight per cent solids level graft latex. An emulsified antioxidant may be added to the graft latex if desired as those skilled in the art will appreciate.

The graft latex is coagulated by admixing therewith 25 weight parts of acrylonitrile per 100 weight parts of latex and aqueous solution of 1 weight per cent magnesium sulfate (based on latex). The resulting mixture is charged to the input conduit 52 of separation apparatus of the type illustrated in FIG. 5. A white dewatered coagulant is collected from conduit 51 and water is collected from conduit 53. The dewatered coagulant is estimated to contain about 10 weight per cent water (based on total coagulant weight). The efficiency of separation is about 98 per cent (based on total latex solids present before coagulation). The lifting screw 58 has a 45° helix and the ratio of screw depth to inside diameter of vessel 44 is about 0.2. The pumping screw has a 15° helix and the ratio of screw depth to inside diameter of vessel 44 is about 0.12. The r.p.m. of shaft 56 is about 50. Flow rate of coagulated latex through conduit 52 into vessel 44 is about 60 cc/minute.

The dewatered coagulant (or wet crumb) from conduit 51 is easily dispersed in acrylonitrile monomer at room temperature and examination of the resulting so-dispersed particles shows that their structure has not been appreciably damaged or altered by the passage through the separation apparatus.

The apparatus may be operated batch-wise intermittently, or continuously, and the apparatus can be used to separate other mixed fluids.

Other and further embodiments will be apparent to those skilled in the art from a reading of the present specification, drawings, and claims.

What is claimed is:

1. Apparatus for gravitationally separating a relatively high viscosity material mixed with a separate phase of a relatively low viscosity fluid material, said apparatus comprising:

A. a generally cyclindrical vessel adapted for orientation with the axis thereof generally vertical when said apparatus is operating, said vessel having as so oriented a first port means defined in an upper portion thereof, a second port means defined in a lower portion thereof, and a third port means defined in a middle portion thereof, the interior length of said vessel being substantially greater than the interior diameter thereof, B. lifting screw means having an axial shaft portion and an integral, peripheral, helically extending, radially projecting, generally continuous blade portion, said screw means being generally coaxial with said vessel and having said blade portion radially terminate in adjacent, spaced relationship to the inner walls of said vessel, said blade portion defining in combination with said vessel and said shaft portion a circumferentially extending envelope region within said vessel between said vessel and said shaft portion, C. journal means, including bearing means and sealing means at opposed end regions of said vessel and adapting said screw means for rotational movements within said vessel, D. a powerhead functionally interconnected with said screw means and adapted to rotatably drive same in a direction such that said blade portion conveys upwardly during operation of said apparatus, and E. conveyance means, including conduit means functionally interconnected with said vessel and adapted to input into said vessel through said third port means a mixture of said high viscosity material and said fluid material to output from said first port means said high viscosity material, and to output from said second port means said fluid material, during operation of said apparatus, F. fluid transfer regulation means functionally interconnected with said second port means and adapted to maintain said fluid in said vessel during operation of said apparatus within a predetermined level range in said lower portion of said vessel; said fluid transfer regulation means including:

B. flow means to permit escape from said second port means of said fluid at a rate not greater than the rate said fluid enters said vessel at said third port means depending upon the degree of separation of the two fluids, and B. pressurization means to maintain said fluid in lower portion of said vessel at an adjustable level above said second port means to achieve efficient separation, G. the relationship between said vessel, said screw means, said port means, and said powerhead being such that, during operation of said apparatus, said high viscosity material being output from said first port means by viscous drag forces generated in said envelope region and said low viscosity fluid being output from said port means by gravity forces when both of said fluids are input into said vessel through said third port means.

2. The apparatus of claim 1 having a pumping screw means generally coaxial with said vessel and located in said vessel between said first port means and the upper end of said blade portion of said lifting screw, said pumping screw having a helix angle and screw depth sufficiently less than said lifting screw such as to receive and pressurize said high viscosity material leaving said upper end of said blade portion before said high viscosity material reaches said first port means during operation of said apparatus and further adapted to output said high viscosity material under a positive pressure from said first port means.

3. The apparatus of claim 2 wherein said lifting screw and said pumping screw rotate on a common shaft, wherein said lifting and said pumping screw generate drag flow forces in said envelope of said high viscosity material sufficient to move said material in the direction of the advancement of said blade portion.

4. The apparatus of claim 3 wherein said fluid transfer regulation means comprises a manometer-like conduit arrangement, one leg of which is functionally associated with said second port means, said manometer-like conduit arrangement further including:

A. pipe means adapted during operation of said apparatus to accommodate the flow rate said fluid enters said vessel at said third port means, and B. pipe means extending in a generally vertical direction and adapted during operation of said apparatus to develop and maintain a head of fluid pressure sufficient to generate in said vessel said sufficient fluid level.

* * * * *